United States Patent Office 3,298,836
Patented Jan. 17, 1967

3,298,836
PROCESS FOR PREPARING COTTAGE
CHEESE CURD
Carl A. Ernstrom, Logan, Utah, assignor to Wisconsin Alumni Research Foundation, Madison, Wis., a corporation of Wisconsin
No Drawing. Filed Mar. 4, 1966, Ser. No. 531,787
10 Claims. (Cl. 99—116)

This application is a continuation-in-part of copending application Serial No. 363,264, filed April 28, 1964, and now abandoned, which was a continuation-in-part of application Serial No. 202,684, filed June 15, 1962, and now abandoned, and which was a continuation-in-part of application Serial No. 59,206, filed September 29, 1960, and now U.S. Patent No. 3,089,776.

The present invention relates to an improved method for making cottage cheese curd. More specifically, this invention relates to a method for making cottage cheese curd from liquid milk containing a high percentage of nonfat milk solids. Still more specifically, this invention relates to a method for making cottage cheese curd from high nonfat solids liquid milk utilizing a food-grade acid to adjust the pH of the milk to within the iso-electric range of the casein present in the milk.

Cottage cheese curd is conventionally made from skim milk containing about 9 percent nonfat milk solids by addition of a starter culture with or without the addition of rennet. A small amount of food grade calcium chloride can also be added to aid in coagulation and the firming of the curd. The starter culture, usually referred to as "lactic starter," contains acid producing organisms and for the most part a lactic acid producing organism, such as *Streptococcus lactis,* or *Streptococcus cremoris.* It is the acid that drops the pH that produces coagulation of the skim milk into a smooth firm gel from which the cottage cheese curd is made. No agitation is necessary as the acid is uniformly developed in-situ in the skim milk by the bacteria.

The most serious problems in the manufacture of cottage cheese by the process noted above are related to abnormal or erratic behavior of the starter cultures. Such problems may involve slow acid development, excessive gas production accompanied by floating curd, abnormal flavors, and in some instances complete inhibition of acid development. At best these problems result in lack of product uniformity, and at worst a complete loss of the milk.

Attempts to overcome these problems and make an acid curd of the cottage cheese type by the direct addition of acid to skim milk, e.g. to duplicate the pH achieved by bacterial fermentation, have posed problems. The reason for this is that in this process, unlike the conventional process where the acid is formed in-situ by bacteria, agitation is necessary to get the added acid intimately mixed with the milk, and agitation at the time of coagulation has been found to prevent the formation of a satisfactory cottage cheese curd, the process for the most part yielding only a fine precipitate or a product having a consistency like buttermilk.

Although in the preparation of certain cheeses, and particularly those cheeses wherein the curd goes through a matting stage and is then reworked, or where the curd is pressed into cheese form, through the use of, for example, a hoop, curd form is not particularly important so long as the desired matting and/or pressing can be accomplished. With cottage cheese, however, curd form is of the utmost importance because the curd is never reworked or pressed and consequently must be suitable in form and condition for use after the curd cutting operation.

It is an object of this invention to provide an improved process for preparing cottage cheese curd.

It is another object of this invention to provide a process for preparing cottage cheese curd from high nonfat solids liquid milk.

It is a further object of this invention to provide a process for preparing cottage cheese curd wherein a food grade acid is utilized to adjust the pH of the liquid milk to within the iso-electric range of the casein present in the milk.

A still further object is to provide a process of preparing cottage cheese curd which is eminently suitable for automatic and continuous operation.

Other objects and advantages will be evident from the following detailed description.

During investigations in the preparation of casein from skim milk it was noted that coagulation at 2° C. (about 35° F.) required the addition of considerably more acid and a lower pH than when acidification was carried out at room temperature. With further investigations it was discovered that curd suitable for the manufacture of cheese, could be made by adding acid, with agitation, to milk cooled below the coagulation temperature. This process where the milk is cooled, the cool milk is acidified with agitation with a water soluble nontoxic acid, and the resulting cool acidified milk is warmed without further agitation until the milk coagulates and forms a curd, is described in U.S. Letters Patent No. 3,089,776, granted May 14, 1963, to Carl A. Ernstrom, the inventor here.

The process described above poses a problem due to the time required to heat up large commercial vats of the cool acidified milk to the coagulation temperature in the absence of agitation. Allowing a large vat of cool acidified milk at about 40° F. to warm up to room temperature of around 70–75° F., for example, was found to take a relatively long period of time, since the curd initially formed around the sides of the vat (much like a big doughnut) and acted as an insulator for the cooler milk in the center of the vat. Heating the cool milk by means of hot water coils in the vats speeded up coagulation but was also found to take a considerable period of time, the curd first forming around the hot coils again acting as an insulator and preventing the rapid transfer of heat to the cool milk some distance from the coils.

To check further into the possibility of rapidly heating the cool acidified milk, it was found that normal skim milk containing about 9.2 percent nonfat milk solids and acidified to pH 4.6, could be heated from 40° F. to 70–75° F., with agitation up to 55° F., and still produce a good curd. Heating with agitation up to 60° F. resulted in an unsatisfactory curd with a mushy appearance. In a similar test, using reconstituted skim milk containing about 11.0 percent nonfat milk solids and acidified to pH 4.7, it was found that the milk could be heated from 40° F. to 70–75° F., with agitation up to 60° F., and still produce a good curd. Heating the reconstituted skim milk with agitation up to 65° F. resulted in an unsatisfactory mushy-type curd.

In continued investigations it was found that measurable time is needed to form curd at 70–75° F. With skim milk containing about 9 percent nonfat milk solids and acidified to pH 4.64, the time was found to be of the order of 3–6 seconds. It was anticipated that this short time period might increase with skim milk of lower nonfat milk solids content and decrease with skim milk of higher nonfat milk solids content. With skim milk containing higher solids content, however, it was unexpectedly discovered that just the reverse took place. For example, skim milk containing about 13 percent solids and acidified to pH 4.5, took about 50–60 seconds to coagulate at 70° F. and skim milk containing about 16 percent solids and acidified to pH 4.5 took about 400 seconds to coagulate at 70° F.

As the addition of concentrated acid to cold skim milk, e.g. at 35–50° F., containing 13 percent or more solids tends to produce local coagulation, it was found when using concentrated acid that the acid should be added slowly with agitation as, for example, to a pump pumping the cold milk. Local coagulation can also be avoided by diluting the acid with water and then adding the water-acid mixture to a skim milk concentrate, e.g. containing about 20–40 percent nonfat milk solids, to obtain the acidified (pH 4.4–4.8) skim milk containing 13 percent or more nonfat milk solids.

Investigations further disclosed that, once the coagulation temperature of the skim milk is reached, the curd strength of the curd produced from the high nonfat milk solids milk increases with temperature much more rapidly than the curd strength of the curd produced from the low nonfat milk solids milk which forms a curd at a lower temperature. Also, unlike the curd produced from low nonfat milk solids milk, once coagulated the curd produced from the high nonfat milk solids milk quickly becomes firm enough to cut. Curd shrinkage of curd produced with high nonfat milk solids milk, e.g. containing 13 percent or more nonfat milk solids, was also found to be materially less than curd shrinkage of curd produced with normal skim milk containing about 9 percent nonfat milk solids. This feature along with the other features noted above was found to make the acidified cool high nonfat milk solids skim milk product particularly adaptable for rapid heating, with excellent curd formation, by passage through a heat exchanger or like-type heating unit.

In addition to the foregoing, it has also been found that when utilizing high nonfat milk solids liquid milk the formed curd can be cooked to the desired moisture levels specified in the standards for cottage cheese as established by the Federal Food and Drug Administration and in accordance with standards of identity for cottage cheese as established by the various states in much less time, i.e. of the order of about ten to fifteen minutes, than is possible with conventional cottage cheese curd making processes.

Thus, the use of high nonfat milk solids liquid milk in the making of cottage cheese curd will permit:

(1) The acidified milk to be handled at temperatures in the range from about 40° to about 70° F. without instant coagulation;
(2) The formation of a firmer curd when the acidified milk is heat coagulated to form a curd;
(3) The cooking of the curd to desired moisture levels in much less time that is possible in conventional cottage cheese making processes;
(4) A material reduction in curd shrinkage over that experienced when normal skim milk containing about 9% nonfat milk solids is used.

The present invention which stems from the basic discoveries described above employs a high nonfat milk solids liquid milk product containing about 13–40 percent nonfat milk solids. Its use in the process described below has been found to achieve the foregoing objects and advantages.

GENERAL METHOD (1) Skim milk containing about 13–40 percent nonfat milk solids and preferably from about 14% to about 16% nonfat milk solids, made, for example, by adding nonfat milk solids to normal skim milk or to water to make reconstituted skim milk or by concentrating normal skim milk, is first cooled, e.g. to about 35–50° F.

(2) A water-soluble, nontoxic acid, e.g. hydrochloric acid, phosphoric acid, lactic acid or like acid, in concentrated or dilute form is added to the cool high nonfat milk solids milk product with sufficient agitation to prevent localized coagulation. The amount of acid added will normally provide the milk, when at about 70° F., with a pH of about 4.5–4.7. (It has been observed that after the acid is added to the cool milk, reaction with the milk constituents is not instantaneous. This is evidenced by the fact that immediately after addition of the acid the pH of the acid milk mixture is frequently as low as about 4.3. After the acid-milk mixture has come to equilibrium, however, the pH rises to a value of from about 4.5 to 4.7. The time in which equilibrium is reached is temperature dependent and decreases as temperature increases. With the milk-acid mixture at 40° F. equilibrium has been observed to be achieved within about 20 minutes.) The addition of a concentrated food processing grade acid with the vigorous agitation provided by metering the acid through a pump pumping the cool milk, is a preferred procedure.

(3) The cool acidified high nonfat milk solids milk product is then warmed to the coagulation temperature, e.g. to about 70–140° F., without agitation, i.e. in the substantial absence of interparticle motion between the particles of the milk-acid mixture, during coagulation and the resulting formation of the curd. The rapid heating of the cool acidified high nonfat milk solids milk product to about 90–125° F. by passage through tubes of a heat exchanger with flow controlled to avoid turbulence and interparticle motion is a preferred procedure for curd formation.

Since, as pointed out hereinbefore, penetration of heat for coagulation purposes through large quantities of acidified milk involves many problems because of the insulating effects of the milk which coagulates initially next to the heated surfaces, the preferred heat exchanger procedure above involves the use of relatively small diameter tubes through which the acidified milk passes. In conventional cottage cheese making the curd is cut into roughly cubical particles from about one-fourth to about three-fourths inches and as a practical matter the diameter of the heat exchanger tubes would be roughly equivalent to these or the desired particle sizes. The use of relatively small diameter heat exchanger tubes permits formation of the curd without internal turbulence (interparticle motion) in the flowing acidified milk stream. The walls of the heat exchanger tubes, to which the acidified milk is exposed are heated by means of a hot water jacket and as the acidified milk contacts the heated wall it coagulates immediately adjacent the wall. Upon coagulation some whey is expelled between the coagulum and the wall to form a thin layer of liquid which then functions as a lubricant between the wall and the formed coagulum allowing the formed coagulum (curd) to slip easily through the tube. As the acidified milk progresses from the inlet end to the outlet end of the heat exchanger tube coagulation of the acidified milk progresses from the portion nearest the tube wall inwardly toward the center of the tube as heat is conducted toward the center of the flowing stream. Thus, the coagulum contrives to form a sleeve around the still liquid center portion of the coagulating milk as it progresses through the heat exchanger tube. The speed with which the acidified milk is forced through what may be termed the coagulation tube and the temperature of the water jacket are controlled so that the milk is completely coagulated by the time it reaches the outlet end of the coagulation tube and the coagulum emerges from the tube as a continuous pencil of firm curd which can be cut to the length desired to approximate the desired curd size.

Following formation of the curd by the foregoing procedure the cut curd along with the whey is passed into a continuous cooker (recycling of the whey in the cooker is carried out to insure the presence of sufficient liquid in the cooker to support movement of the curd through the cooker) where the temperature is raised to from about 110–160° F. Heating of the curd in the cooker is carried out in such a way that the increase in temperature of the curd in whey is slow at the beginning of the cooking process but rapid toward the end. The total cooking time normally requires from about 10 to about 25 minutes.

As the hot curd and whey emerges from the cooker the whey is drained from the curd and the curd is held for from about 10 to about 90 seconds without further treatment to control the moisture content, it having been observed that under such condition the curd expels moisture rapidly. The curd is then sprayed with or immersed in wash water at a temperature of from about 80–120° F. for from about one to 10 minutes. Optionally, it is then further washed with water at a temperature of about 55–80° F. for from about one to about 10 minutes and subsequently with cold water (about 40° F.) for a time just sufficient to cool the curd. After the cold water wash the curd is allowed to drain for a time sufficient to bring its moisture content to below 80%.

With regard to the washing procedure it was found that the higher the temperature of the initial wash water the more effective was the washing and the more quickly the pH of the curd increased to the desired pH of about 4.7 to 4.8. In addition, it was found that the pH of the wash water should be held below about 6.5 if partial dissolution of the curd is to be avoided but should not be too acid or it will not have the desired effect on raising the pH of the curd.

Although it is not necessary to the production of excellent cottage cheese curd by the process of this invention, if desired, rennet can be used in the preparation of the curd with some attendant advantages. When rennet extract is to be used it is preferred that either of the following procedures be employed.

The high nonfat solids liquid milk, after pasteurization, is brought to a temperature in the range from about 80° to 105° F. and rennet extract is added at the rate of from about 1 ml. to about 20 ml. per 1,000 lbs. of milk. As soon as the rennet has been added cooling of the milk is begun and continued until it has reached a temperature of about 40° F. At the time the renneted milk has reached about 40° F. a nontoxic, food processing grade acid is added and the milk is then treated further in accordance with the general method outlined above.

It is evident that the described rennet treatment would be readily adaptable to a continuous process such as has been described hereinbefore. It is contemplated, for example, that suitable rennet action on the pasteurized milk could be achieved by injecting the rennet into a holding tube of adequate length installed between the regenerating and cooling section of a high temperature-short time (H.T.S.T.) pasteurizer, the time required for the renneted milk to traverse the holding tube being adequate for the desired rennet activity before the milk is cooled.

Alternatively, the rennet extract can be added to the cooled skim milk obtained in Step 1 of the general method outlined hereinbefore, or to the cooled milk just after the addition of the acid according to Step 2 of the general method.

The following examples will serve to illustrate the invention.

*Example I*

To 1,000 gallons of liquid skim milk containing about 13–14 percent nonfat milk solids and cooled to a temperature of about 40–45° F. is added with vigorous agitation sufficient concentrated hydrochloric acid to provide the resulting high nonfat milk solids products, when at a temperature of about 70° F., with a pH of about 4.5–4.7. The resulting acidified high nonfat milk solids product is then warmed rapidly without further agitation to about 90–110° F. by passage through tubes of a heat exchanger. As the high nonfat milk solids skim milk product coagulates and the curd sets and firms up rapidly, the curd forms during flow through the tubes and can be cut to desired size for further processing as it leaves the heat exchanger.

*Example II*

About 400 liters of cool liquid skim milk, e.g. at about 35–40° F., containing about 16 percent nonfat milk solids are circulated in a system by a pump. About 1.8 liters of concentrated hydrochloric acid is slowly added to the high nonfat milk solids milk product in the highly turbulent region in the center of the pump. The resulting acidified milk product which has a pH of about 4.6 and slightly less than 16 percent nonfat milk solids, is then pumped to a heat exchanger where it is rapidly warmed to from about 90° to 125° F. As in Example I, the curd is firm enough to cut as it leaves the exchanger.

*Example III*

The procedure of Example II is followed except that the acidified milk product is rapidly warmed to a temperature in the range of 100°±5° F. in the heat exchanger.

*Example IV*

To 1,000 gallons of concentrated liquid skim milk containing about 32 percent nonfat milk solids and cooled to about 40° F. is added sufficient cool dilute hydrochloric acid (concentrated HCl mixed with an equal volume of water) with additional cool water to provide the acidified milk with a pH of about 4.6 and a nonfat milk solids content of about 15–16 percent. The resulting cool acidified high nonfat milk solids skim milk product is then passed rapidly through a heat exchanger where it is heated to 90–110° F. in accordance with the procedure described in the above example.

*Example V*

This example is in accordance with Example III, except that reconstituted liquid skim milk containing about 18 percent nonfat milk solids is used, with dilution by acid and water to provide a final product containing about 14 percent nonfat milk solids.

*Example VI*

500 gallons of liquid skim milk containing about 15 percent nonfat milk solids is first cooled to about 43° F. and acidified with agitation with concentrated hydrochloric acid to provide the acidified high nonfat milk solids product, when at a temperature of about 70° F., with a pH of about 4.5–4.6. The cool acidified high nonfat milk solids product is then warmed to a coagulation tempertaure of about 70–75° F. without agitation during coagulation and the resulting formation of the curd.

In the above examples, the warming of the acidified milk can be accomplised by any known means including steam or hot water, or electrically by dielectric or resistance heating, with the use of a heat exchanger or like-type heating equipment which provides for a continuous operation being preferred. Also, hydrochloric acid can be replaced by other inorganic or mineral acids such as, for example, phosphoric acid, as well as by organic acids such as lactic and acetic acids or by any equivalent water-soluble acid which does not leave toxic residues when washed from the curd. And it is in this latter connotation that the term "non-toxic acid" is applied in this specification and the appended claims.

The process of the present invention calling for heating of the high nonfat milk solids liquid milk product acidified with the water-soluble, nontoxic acid provides, as compared to the use of normal or conventional low nonfat milk solids skim milk products, for a more rapid increase in curd strength, for the quick development of a curd firm enough to cut and, finally, for materially less curd shrinkage. While the process eliminates the need for acid-forming bacteria, it will be understood that rennet in various amounts can be used. If desired, flavor-imparting agents commonly used in this art including starter distillate, lactic or citric acids, can be employed to provide desired taste or flavor.

The cottage cheese curd obtained from the application of the improved process of this invention can be creamed as is well known in the art or can be utilized in the same manner as is cottage cheese curd produced by conventional methods.

What is claimed is:

1. An improved process for preparing cottage cheese curd which comprises adding a water-soluble, nontoxic acid to a cool high nonfat milk solids liquid milk product containing about 13–40 percent nonfat milk solids with agitation at a temperature of from about 35° to about 50° F., sufficient acid being added to provide the said milk product, when at a temperature of about 70° F., with an equilibrium pH in the range from about 4.5 to about 4.7, and then warming the resulting acidified high nonfat milk solids product to the coagulation temperature in the substantial absence of turbulence and interparticle motion in the milk-acid mixture during subsequent coagulation and the resulting formation of the curd.

2. The process of claim 1 wherein the acidified high nonfat milk solids milk product is warmed to a temperature of from about 70°–140° F. in the substantial absence of motion between the particles in the milk-acid mixture to coagulate the milk and set the resulting curd.

3. The process of claim 2, where the cool acidified high nonfat milk solids milk product is warmed to the coagulation temperature by passage through a heat exchanger.

4. A continuous process for preparing an acid cottage cheese curd which comprises slowly adding, with vigorous agitation, a water-soluble, nontoxic acid to a stream of cool high nonfat milk solids milk product containing about 13–40 percent nonfat milk solids, sufficient acid being added to provide the acidified high nonfat milk solids milk product, when at a temperature of about 70° F., with an equilibrium pH in the range from about 4.5–4.7, and then coagulating the milk product and setting the curd by heating the resulting acidified high nonfat milk solids milk product to a temperature of about 90° to about 125° F. by passage of the stream through a heat exchanger, said stream being substantially devoid of turbulence and interparticle motion during said passage.

5. The process of claim 4, wherein the acid is a concentrated food processing grade hydrochloric acid, the acid is added through a pump pumping the stream of cool high nonfat milk solids milk product, and the curd is cut as it leaves the heat exchanger.

6. The process of claim 4, where the liquid high nonfat milk solids milk product contains about 14–16 percent nonfat milk solids.

7. A continuous process for preparing a cottage cheese curd which comprises slowly adding, with vigorous agitation, a water-soluble, nontoxic acid to a stream of liquid milk containing about 13% to about 40% nonfat milk solids while maintaining said milk at a temperature in the range from about 35–50° F., sufficient acid being added to give the acidified milk product an equilibrium pH in the range from about 4.5 to 4.7 when at a temperature of about 70° F., heating the said stream of acidified milk product to a temperature in the range from about 90° to about 125° F. by passage of the said stream in nonturbulent flow and in the substantial absence of interparticle motion through a heat exchanger whereby the acidified milk product is coagulated and the resulting curd is set, cutting the set curd as it leaves the heat exchanger cooking the cut curd by passing the said cut curd and whey emerging from the said heat exchanger through a second heat exchanger wherein the temperature of the curd and whey is raised to from about 110° to about 160° F., draining the whey from the curd and holding the curd in the absence of further treatment from about 10 to about 90 seconds, washing the curd with water at a temperature of from about 80° to about 120° F. for from about one to about 10 minutes, draining the wash water from the curd, subjecting the curd to a second wash with water at a temperature of from about 55° to about 80° F. for from about one to about ten minutes, draining the wash water from the curd, cooling the curd by washing with cold water and draining the curd for a time sufficient to reduce its moisture content to less than 80% by weight.

8. The process of claim 7 wherein rennet in an amount equivalent to about 1–20 ml. per 1000 pounds of milk is added to the cold acidified milk prior to passage of the milk product through the heat exchanger.

9. The process of claim 7 wherein rennet in an amount equivalent to about 1–20 ml. per 1000 pounds of milk is added to the cold milk prior to the addition of the nontoxic, watersoluble acid.

10. A continuous process for preparing a cottage cheese curd which comprises heating a stream of milk containing from about 13% to about 40% nonfat milk solids to a temperature of from about 80° to 105° F., adding rennet to the said stream of milk in an amount equivalent to about 1–20 ml. per 1000 pounds of the milk, cooling the stream of renneted milk to a temperature of about 40° F., adding continuously and with vigorous agitation to the stream of renneted cooled milk a water-soluble, nontoxic acid in an amount sufficient to acidify the renneted milk to an equilibrium pH in the range from about 4.5 to 4.7 when at a temperature of about 70° F., heating the said stream of acidified milk product to a temperature in the range from about 90° to about 125° F. by passage of the said stream in nonturbulent flow and in the substantial absence of interparticle motion through a heat exchanger whereby the acidified milk product is coagulated and the resulting curd is set, cutting the set curd as it leaves the heat exchanger, cooking the cut curd by passing the said cut curd and whey emerging from the said heat exchanger through a second heat exchanger wherein the temperature of the curd and whey is raised to from about 110° to about 160° F., draining the whey from the curd and holding the curd in the absence of further treatment from about 10 to about 90 seconds, washing the curd with water at a temperature of from about 80° to 120° F. for from about one to about 10 minutes, draining the wash water from the curd, subjecting the curd to a second wash with water at a temperature of from about 55° to about 80° F. for from about one to about ten minutes, draining the wash water from the curd, cooling the curd by washing with cold water and draining the curd for a time sufficient to reduce its moisture content to less than 80% by weight.

References Cited by the Examiner

UNITED STATES PATENTS

| | | | |
|---|---|---|---|
| 2,908,575 | 10/1959 | Spiess et al. | 99—116 |
| 2,997,395 | 8/1961 | Berridge | 99—116 |

A. LOUIS MONACELL, *Primary Examiner.*

D. M. STEPHENS, *Assistant Examiner.*